United States Patent Office 3,492,573
Patented Jan. 27, 1970

3,492,573
METHOD AND APPARATUS FOR COMPARING TWO SIGNAL COMPONENTS OF A COMPLEX SIGNAL
Maurice Gateau, Villejuif, and Joseph Hetysi, Saint-Brice-sous-Foret, France, assignors to Société anonyme dite ARTUS, Paris, France, a French society
Filed Apr. 25, 1967, Ser. No. 633,476
Claims priority, application France, May 25, 1966, 62,935
Int. Cl. G01r *23/16, 27/02;* H03d *13/00*
U.S. Cl. 324—77                                5 Claims

ABSTRACT OF THE DISCLOSURE

Method of comparing two signals present together in a complex signal, comprising the first step of chopping said complex signal at the frequencies of the two signals so as to produce two chopped outputs, the two chopping actions being in the same phase relation with the two signals the second step of integrating the chopped output and comparing the two integrated outputs in a differential amplifier.

---

The invention relates to a method of measuring differences in the modulation of a complex signal.

In a guided landing system known as the "instrument landing system" (I.L.S.), a carrier wave is emitted in line with the runway, at a frequency of 100 mc./s., in two beams directed symmetrically in relation to the centre of an aircraft runway. One beam is modulated at 90 cycles and the other at 150 cycles. The receiver in the aircraft picks up a complex signal modulated at 90 and 150 cycles, the difference between the amplitudes of these modulations indicating the deviation from the correct approach path for landing.

The problem, after detection and amplification of the complex signal, is thus to measure the difference in amplitude between the 90 and 150 cycles signal components.

For measuring this difference, selective filters have been used to separate the two frequencies of 90 and 150 cycles, but filters do not normally provide very accurate measurement.

Normally, filters cannot carry out their function under all operating conditions. Any frequency discrepancy, whatever its origin—faulty mechanical adjustment, temperature effects, ageing of the tuning capacitors, transmitted frequencies differing slightly from the set values, etc.—can alter the amplitude of the I.L.S. signals, resulting in incorrect measurement of the component differences.

The present invention therefore aims at providing a method of measurement which does not rely on measuring filters and, whilst also being a periodic, is not subject to amplitude variations due to the factors mentioned above.

The present invention provides a method of comparing a first and a second signal having a first and a second frequency respectively, said signals being present together in a complex modulated signal, comprising the steps of chopping said complex signal at said first frequency with a first chopping action having a controlled phase relation to said first signal, so as to produce a first chopped output, chopping said complex signal at said second frequency with a second chopping action having a controlled phase relation to said second signal, so as to produce a second chopped output, said controlled phase relations being arranged to be equal, and comparing the two chopped outputs.

As this method uses no measuring filter, it eliminates the amplitude variations due to the difficulties already referred to and enables correct measurement to be made, irrespective of the reception conditions.

Figure 1:
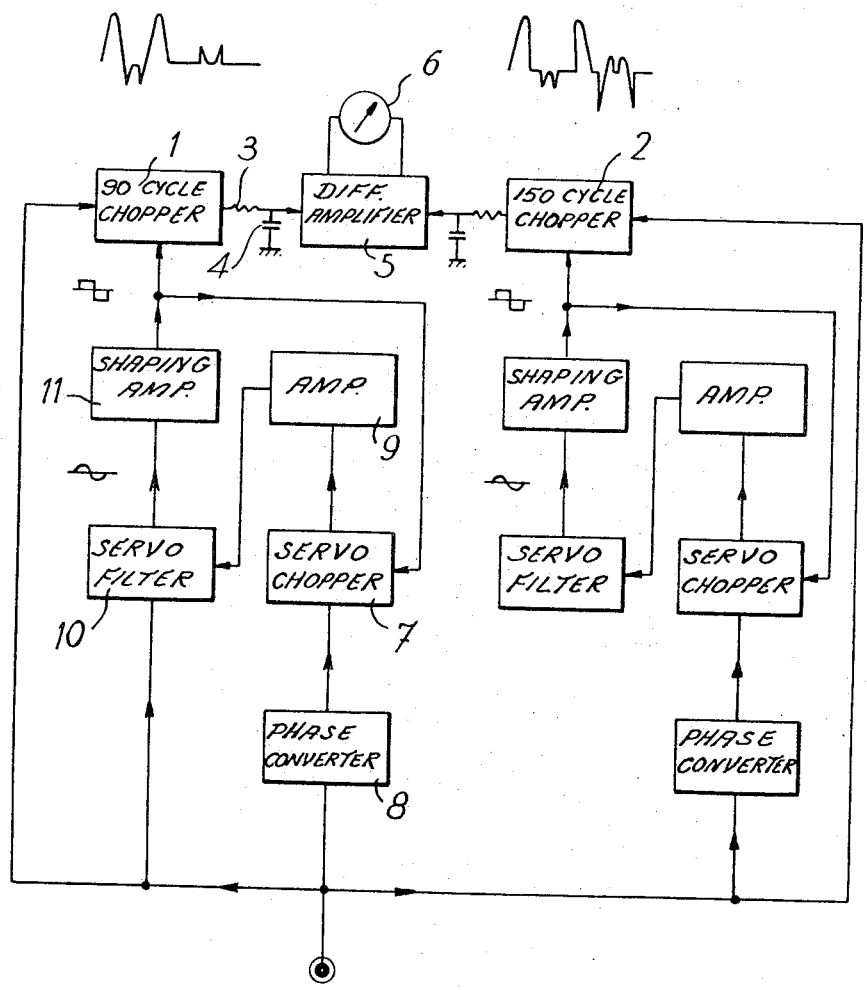
Figure 2:
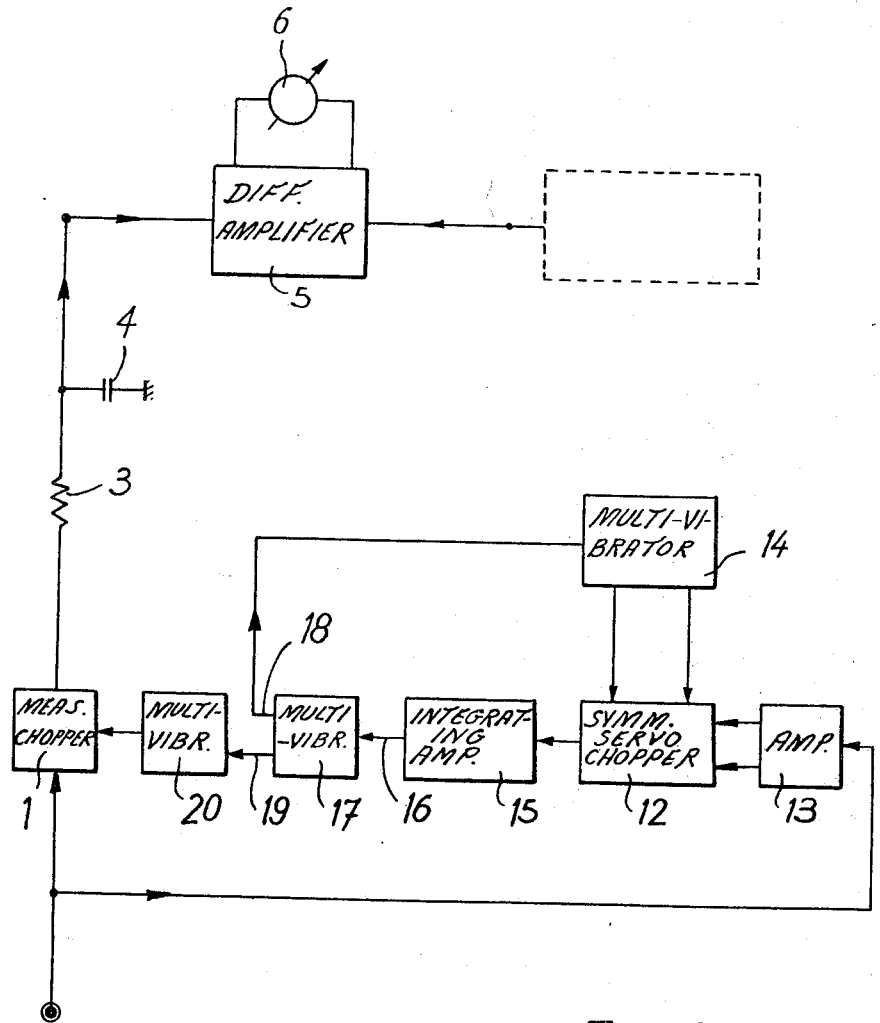

Two embodiments of apparatus for comparing I.L.S. signals will now be described, by way of example, in accordance with the accompanying diagrammatic drawings in which:

FIGURE 1 is a block diagram of one embodiment of apparatus for comparing I.L.S. signals showing chopped and unchopped waveforms; and FIGURE 2 is a block diagram showing only one circuit path of a further embodiment of apparatus for comparing I.L.S. signals.

The following description is based on the measurement of the modulation difference of an I.L.S. signal, amplified and detected, received in the form of a complex signal composed of two signals, one at 90 cycles and the other at 150 cycles.

With the measuring device shown in FIGURE 1, the complex signal with which the invention method is concerned is passed to one chopper 1, which cuts the signal at a frequency of 90 cycles, and to another chopper 2, which cuts the signal at a frequency of 150 cycles.

The complex signal may be written down in the form:

$$F(t) = U_1 \sin(\omega_1 t + \varphi_1) + U_2 \sin(\omega_2 t + \varphi_2)$$

in which $U_1 \sin(\omega_1 t + \varphi_1)$ is the 90-cycle component and $U_2 \sin(\omega_2 t + \varphi_2)$ is the 150-cycle component.

If this signal be cut at the frequency of 90 cycles, the mean value $I_{90}$ of the signal thus cut during period of T of the signal $F(t)$ will be:

$$I_{90} = \frac{1}{T} \int_0^T F(t) dt$$

and T is equal to 1/30 of a second.

When the chopper cuts the signal during one-half cycle, lasting a 1/180 second; we get $$I_{90} = \frac{1}{T} \left[ \int_0^{\frac{1}{180}} F(t) dt + \int_{\frac{3}{180}}^{\frac{4}{180}} F(t) dt + \int_{\frac{5}{180}}^{\infty} F(t) dt \right]$$

and calculation shows that $$I_{90} = \frac{U_2}{\pi} \cos \varphi_2$$

independent of the mean mean value of the signal at 150 cycles.

Similarly, the mean value $I_{150}$ of the complex signal chopped at 150 cycles can be written as $$I_{150} = \frac{U_2}{\pi} \cos \varphi_2$$

We see, therefore, that if the complex signal is chopped with a phase difference of $\varphi_1 = \pi/2$ or $\varphi_2 = \pi/2$, the signal is nil, since $\pi/2 = 0$.

Similarly, if the chopping is in phase, $\varphi_1 = \varphi_2 = 0$ and the signal is at its maximum.

At the output from the chopper 1 or 2, then, a signal is obtained which, integrated by an integrating circuit consisting of a resistor, 3, and a capacitor, 4, is proportional to the 90-cycle or 150-cycle component of the complex signal.

For greater ease and precision, the two choppers cut the signal in phase and the two integrated signals from the choppers 1 and 2 are passed to a differential amplifier, 5, on the output side of which is an indicator, 6, such as a moving-frame galvanometer, which gives the difference in modulation.

The two choppers 1 and 2 must therefore be controlled by a servo device ensuring that the signal is cut in phase at the desired frequency.

The control circuit of each chopper comprises a servo chopper, 7, which cuts the signal after its passage through a phase converter, 8, which puts the signal out of phase by π/2, giving a cut signal of zero mean value when the chopper 7 is operated in phase with the signal and at the same frequency.

The signal, cut by the chopper and amplified in an amplifier, 9, controls the tuning of a servo filter, 10, the purpose of which is to filter the signal to obtain the 90-cycle or 150-cycle component signal, according to the measuring chopper concerned.

The filtered signal, after conversion to a square-wave signal in a shaping amplifier, 11, controls the measuring chopper and the servo chopper 7.

If the output signal from the chopper 7 is not zero, the resulting error voltage, amplified by the amplifier 8, restores the tuning and gives a square-wave signal, in phase and at the desired frequency (90 or 150 cycles).

In another form of the device controlling the measuring chopper, shown in FIGURE 2, the complex signal is passed to a symmetrical servo chopper, 12, after passing through an amplifier 13, the two output paths of which have a phase difference of π.

This chopper 12 is controlled by a multi-vibrator, 14, which is bi-stable, so as to cut the signal with a phase difference of π/2.

The signal cut by the chopper 12 is integrated and amplified in an integrating amplifier, 15, the output voltage 16 of which pilots an astable multi-vibrator, 17, the frequency of which, depending on the voltage 16, is equal to twice the frequency of the component signal (90-cycle or 150-cycle).

This multi-vibrator 17 has two outputs, out of phase with each other by π, one of which, 18, controls the multi-vibrator 14 and the other, 19, controls a bi-stable multi-vibrator, 20, which controls the measuring chopper 1.

It is clear, therefore, that if the cutting by the chopper 12 is indeed π/2 out of phase with the signal, no voltage 16 arises and the output signals from the multivibrators 14 and 20 are in fact out of phase by π/2, so that the measuring chopper 1 does cut the signal in phase.

If the phase difference at the chopper 12 is not precisely π/2, an error voltage 16 arises, modifying the frequency of the multi-vibrator 17 so as to restore the correct phase relationship between the chopper and chopped signals.

The invention is not limited to the forms here described and illustrated, but includes all variants thereof.

What is claimed is:

1. A method of comparing a first and a second signal having a first and a second frequency respectively said signals being present together in a complex modulated signal, comprising the steps of phase-displacing said complex signal by 90°, chopping said phase-displaced signal with two chopping actions respectively in phase with said first and second chopping actions whereby to produce first and second intermediate outputs whose values are zero when the said first and second chopping actions are respectively in phase with the first and second signals, respectively controlling said first and second chopping actions in dependence on said first and second intermediate outputs whereby to tend to maintain said intermediate outputs at zero, filtering the complex signal to produce a first control signal nominally at the said first frequency, controlling the said first chopping action in dependence on said first control signal.

automatically tuning the said filtering in dependence on the said first intermediate output whereby to so adjust the first chopping action as to tend to maintain the first intermediate output at zero.

filtering the complex signal to produce a second control signal nominally at the said second frequency, controlling the said second chopping action in dependence on the said second control signal, and automatically tuning the latter said filtering in dependence on the said second intermediate output to so adjust the said second chopping action as to tend to maintain the second intermediate output at zero, chopping said complex signal at said first frequency with a first chopping action having a controlled phase relationship to said first signal so as to produce a first chopped output, chopping said complex signal at said second frequency with a second chopping action having a controlled phase relationship to said second signal so as to produce a second chopped output, said controlled phase relationships being arranged to be equal, and comparing the two chopped outputs, each said controlled phase relationship being such that the first and second chopping action are respectively in phase with the first and second signals.

2. Apparatus for comparing a first and a second signal having a first and a second frequency respectively, said signals being present together in a complex modulated signal, comprising first and second circuit paths, first and second chopper means respectively in said first and second paths and respectively operative to produce first and second chopped outputs in said first and second circuit paths, first control means responsive to said complex signal and connected to the first chopper means for controlling the first chopper means to operate at said first frequency and in a controlled phase relationship with said first signal, said controlled phase relationship being such that the first and second chopper means respectively operate in phase with the first and second signals, second control means responsive to said complex signal and connected to the second chopper means for controlling the second chopper means to operate at said second frequency and in a controlled phase relationship with said second signal, comparing means connected to said first and second circuit paths and operative to compare said first and second chopped outputs, phase-displacing means connected to receiver said complex signal for phase-displacing said complex signal by 90°.

third chopper means in said first control means and connected to chop the phase-displaced complex signal, means controlling said third chopper means to operate in phase with said first chopper means whereby to produce a first intermediate output which is zero when the first chopper means operates at said controlled phase relationship, fourth chopper means in said second control means and connected to chop the phase-displaced complex signal, means controlling said fourth chopper means to operate in phase with said second chopper means whereby to produce a second intermediate output which is zero when the second chopper means operates at said controlled phase relationship, and tuning means in said first and second control means respectively operative in response to said first and second intermediate outputs to control the operation of said first and second chopper means whereby to tend to maintain said first and second intermediate outputs at zero.

3. Apparatus according to claim 2, in which the said tuning means in said first control means comprises adjustable filter means having a nominal pass frequency equal to said first frequency, and the said tuning means in said second control means comprises adjustable filter means having a nominal pass frequency equal to said second frequency, said first and second adjustable filter means being connected to said third and fourth chopper means respectively whereby to be adjusted by said first and second intermediate outputs respectively.

4. Apparatus for comparing a first and a second signal having a first and a second frequency respectively, said signals being present together in a complex modulated signal, comprising first and second circuit paths, first and second chopper means respectievly in said first and second paths and respectively operative to produce first and second chopped outputs in said first and second circuit paths, first control means responsive to said complex signal and connected to the first chopper means for controlling the first chopper means to operate at said first frequency and in a controlled phase relationship with said first signal, said controlled phase relationship being such that the first and second chopper means respectively operate in phase with the first and second signals, second control means responsive to said complex signal and connected to the second chopper means for controlling the second chopper means to operate at said second frequency and in a controlled phase relationship with said second signal, comparing means connected to said first and second circuit paths and operative to compare said first and second chopped outputs, third chopper means in said first control means and connected to chop said complex signal, phase control means in said first control means connected to control said third chopper means to operate 90° out of phase with said first chopper means whereby said third chopper means produces a first intermediate output which is zero when the first chopper means operates at said controlled phase relationship, phase control means in said second control means connected to control said fourth chopper means to operate 90° out of phase with the said second chopper means whereby the fourth chopper means produces a second intermediate output which is zero when the second chopper means operates at said controlled phase relationship, and tuning means respectively operative in response to said first and second intermediate outputs and connected to control the operation of said first and second chopper means respectively whereby to tend to maintain the first and second intermediate outputs at zero.

5. Apparatus according to claim 4, including a respective bistable circuit associated with each said chopper means to control said chopper means, the phase control means in said first control means comprising an adjustable multivibrator circuit having a nominal frequency integrally related to said first frequency and connected to control the bistable circuits respectievly associated with the first and third chopper means, and the phase control means in said second control means comprising an adjustable multi-vibrator circuit having a nominal frequency integrally related to said second frequency and connected to control the bistable circuits respectively associated with the second and fourth chopper means, the said tuning means comprising means operative to adjust the frequencies of the multi-vibrator circuits in dependence on the first and second intermediate outputs.

References Cited

UNITED STATES PATENTS

| | | | |
|---|---|---|---|
| 3,327,219 | 6/1967 | Cunningham | 325—325 |
| 3,382,435 | 5/1968 | Bockholt. | |

FOREIGN PATENTS 270,768   3/1964   Australia.

WILLIAM F. LINDQUIST, Primary Examiner

P. F. WILLE, Assistant Examiner

U.S. Cl. X.R.

324—83; 328—151